Nov. 26, 1929.   F. E. GOUGH   1,737,082
VARIABLE COMPRESSION INTERNAL COMBUSTION ENGINE
Filed Oct. 9, 1928   4 Sheets-Sheet 3
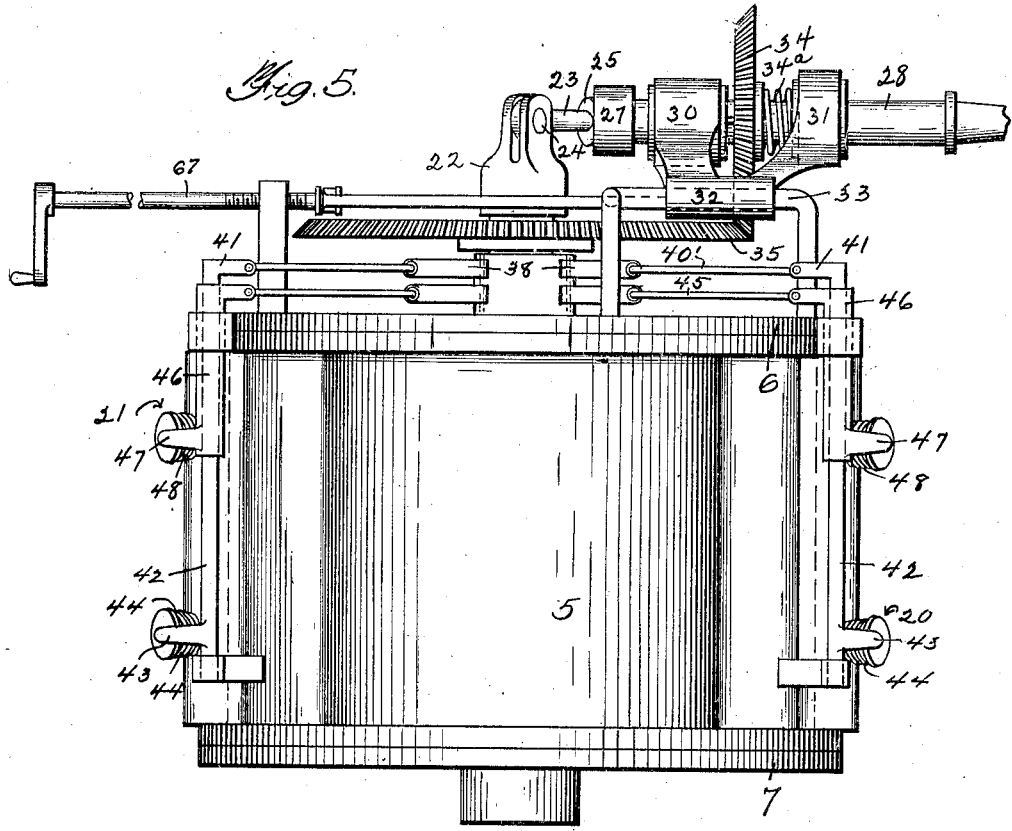
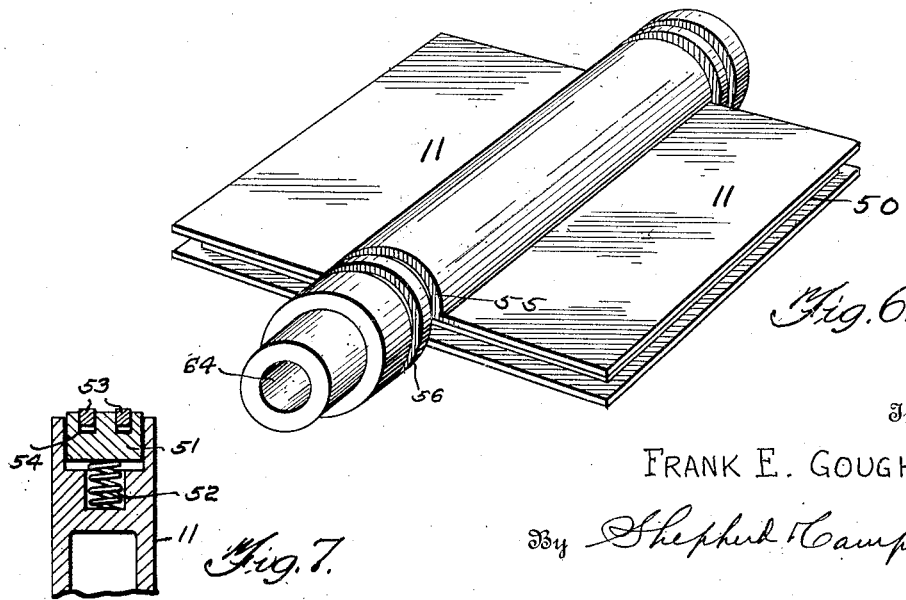
Inventor
FRANK E. GOUGH,
By Shepherd & Campbell
Attorneys

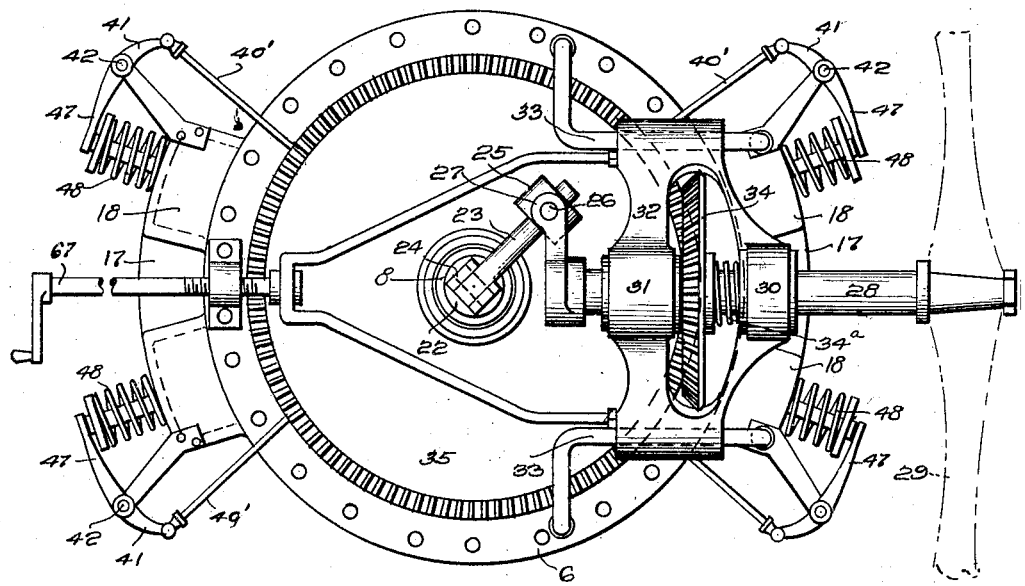

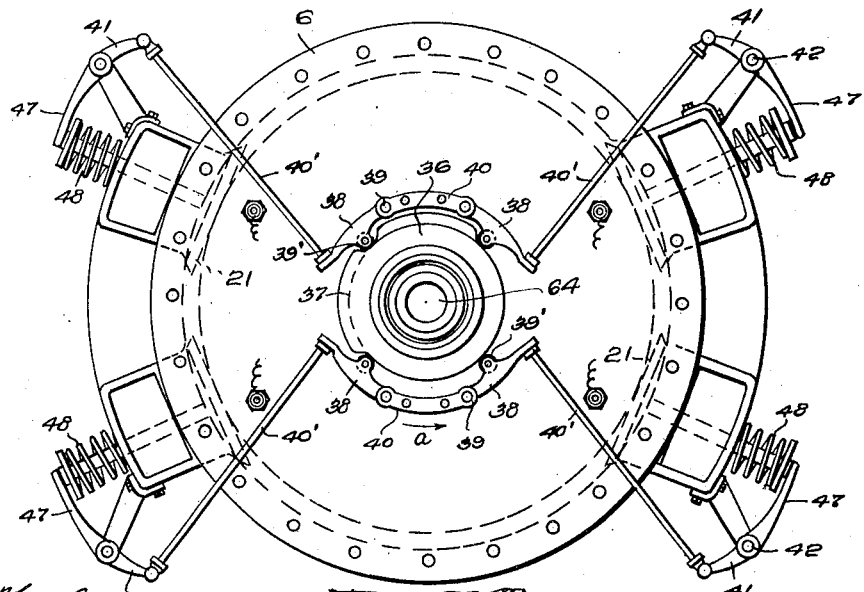
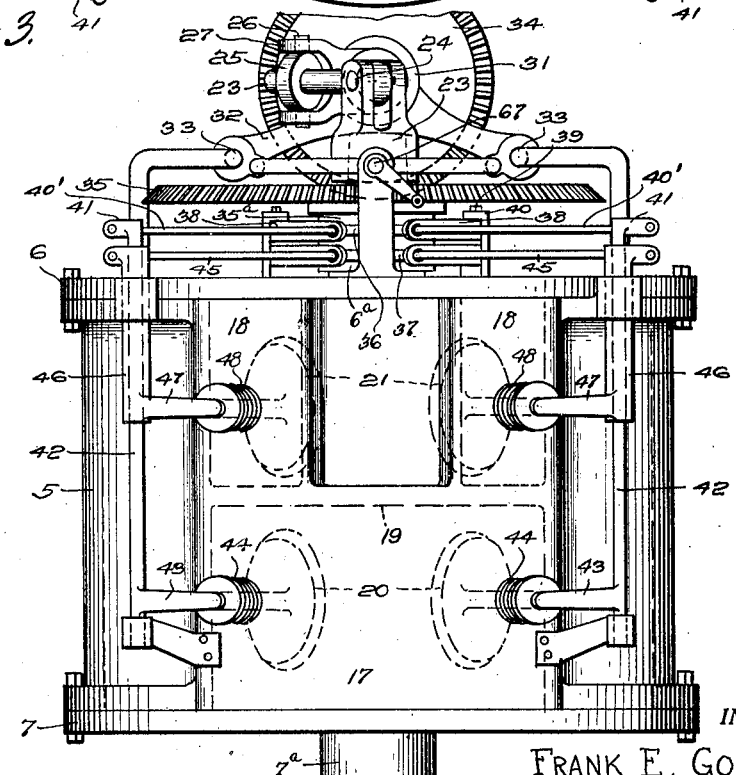

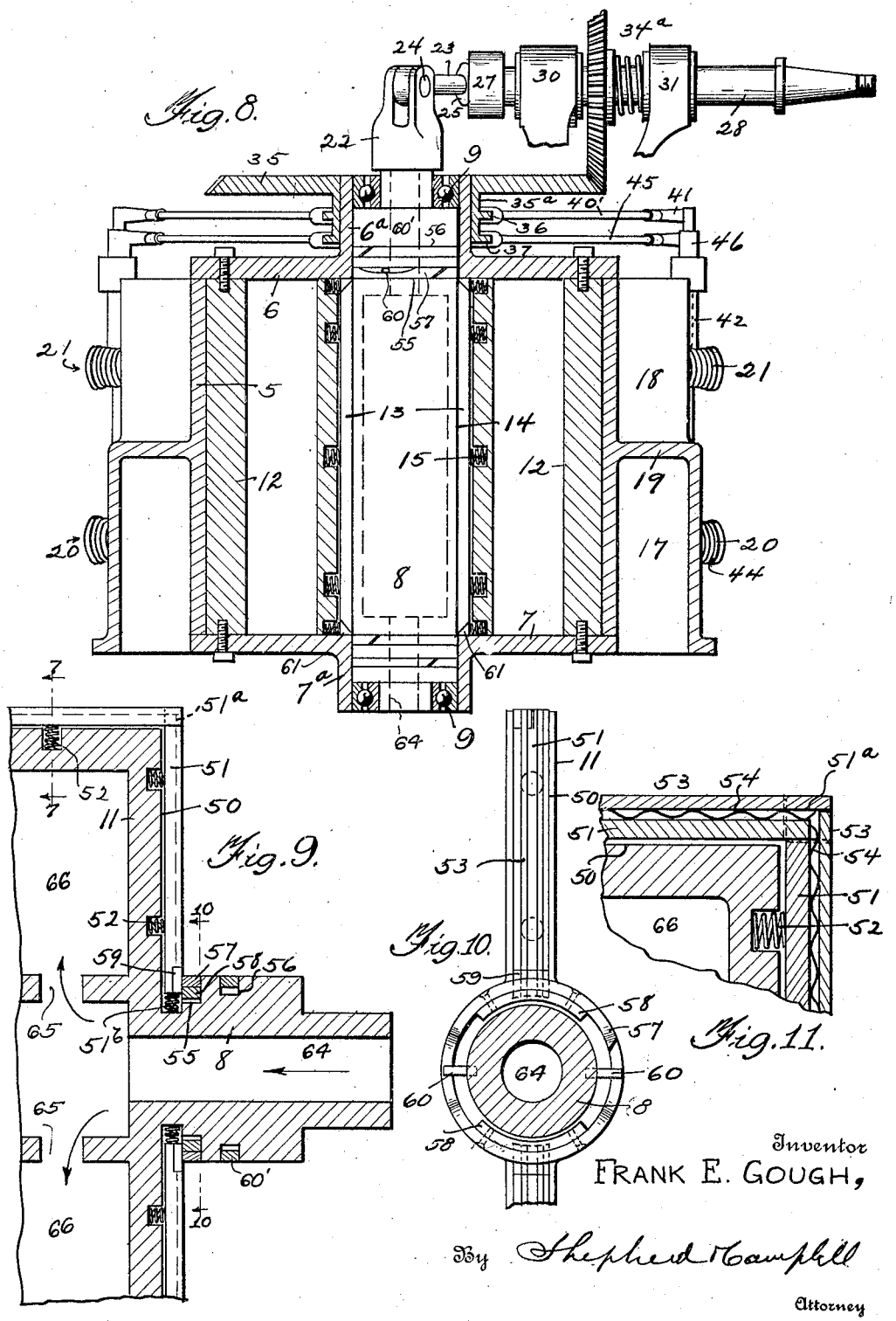

Patented Nov. 26, 1929

1,737,082

UNITED STATES PATENT OFFICE

FRANK E. GOUGH, OF OKLAHOMA CITY, OKLAHOMA, ASSIGNOR TO GOUGH AIRCRAFT CORPORATION, A CORPORATION OF OKLAHOMA

VARIABLE-COMPRESSION INTERNAL-COMBUSTION ENGINE

Application filed October 9, 1928. Serial No. 311,350.

This invention relates to internal combustion engines of the oscillatory type, and it has for its primary object the production of an engine of this character, constructed in such manner as to yield the maximum efficiency in operation in proportion to the weight of the engine. The engine of the present invention is primarily intended for aviation use, though it is, of course, not limited to that field. In accomplishing the object sought, namely that of attaining the highest degree of efficiency, in proportion to the engine weight, I have devised an engine construction permitting variation of compression to meet the conditions existing at any given moment.

It is a well known fact that, while internal combustion engines operating at high compression yield the maximum output of power, in proportion to the fuel consumed, they are hard to start and are easily stalled. That is to say, a low compression engine will operate much more satisfactorily at low piston speeds than a high compression engine. It is, therefore, desirable to render it possible to vary the compression ratio, or piston clearance, at will. Since internal combustion engines used for aviation purposes are frequently called upon to function at high altitudes it follows that they are frequently operating in rarified atmosphere, and that the amount of fuel drawn into the cylinders is correspondingly less than would be the case if the engine were operating at ordinary sea level pressure. The engine of the present invention is so designed that the same adjustment that decreases the piston clearance increases the piston travel, with the result that simultaneously with the increase of compression, I secure a marked increase in the amount of fuel drawn in to be compressed.

It is a further object of the invention to accomplish the foregoing highly desirable and advantageous results through the medium of a mechanism of extreme simplicity and light weight and one that will yield an even and steady output of power.

A further object of the invention is to provide an engine of the character described of extremely long life, and one in which means are provided for compensating for wear between the various working surfaces, so that it will not be necessary to dismantle the engine for frequent re-adjustment and repair.

A further object of the invention is to provide a novel sealing means, or packing, particularly adapted for use in conjunction with an engine of the type of that herein shown and described.

Further objects and advantages of the invention will be set forth in the detailed description which follows.

In the accompanying drawings:

Fig. 1 is a plan view of an engine constructed in accordance with the invention, Fig. 2 is a plan view with the upper cylinder head and associated parts removed, Fig. 3 is a plan view with the upper cylinder head and the valve operating mechanism in place, but with the power take-off mechanism omitted.

Fig. 4 is a side elevation of the engine.

Fig. 5 is a side elevation at right angles to Fig. 4,

Fig. 6 is a perspective view of one of the vanes or pistons, hereinafter described, Fig. 7 is a fragmentary sectional view through one edge of said piston, on line 7—7 of Fig. 9, Fig. 8 is a vertical sectional view through the engine, Fig. 9 is a fragmentary sectional view through the vanes or pistons, Fig. 10 is a transverse sectional view upon line 10—10 of Fig. 9.

Fig. 11 is a sectional view through one of the corners of the piston, illustrating the overlapping arrangement of the packing strips, hereinafter described.

Like numerals designate corresponding parts in all of the figures of the drawings.

By referring to the drawings, it will be seen that the engine of the present invention comprises a cylinder 5, having an upper head 6, and a lower head 7. A hollow shaft 8 is mounted by means of anti-friction bearings 9, in the hubs 6ª—7ª of the upper and lower cylinder heads, respectively. The shaft 8 is an oscillatory one, and it carries radially disposed pistons or vanes 11, which move from the full to the dotted line position illustrated in Fig. 2. Abutments 12 extend from cylinder head 6 to cylinder head 7, and from the inner periphery of the cylinder 5 to the outer periphery of the shaft 8. Master packing strips 13 are mounted in channels 14, of the inner faces of the abutments, and are spring pressed toward shaft 8, by springs 15. In addition, auxiliary smaller packing strips 16 are mounted in the master packing strips and are spring pressed against the periphery of the shaft by small flat springs 16$^a$, in a manner common in the packing art. Manifolds at the opposite sides of the engine are divided intermediate the height of the cylinder to form the lower intake manifolds 17 and the upper exhaust manifolds 18, the division partition being indicated at 19. There are four intake valves 20 and four exhaust valves 21. The upper end of the shaft 8 carries a forked head 22, within which a rod 23 is pivoted at 24. The rod 23 has sliding engagement with a block 25 that is trunnioned at 26, in a forked crank 27. The crank 27 is fast upon the main driven shaft 28, which may carry an aeroplane propeller 29, balance wheel, or other equivalent element. The shaft 28 is journaled in bearings 30 and 31, of a cross head 32, the latter being slidably mounted upon guides 33. A gear wheel 34 is splined upon the shaft 28, and is held in mesh with a larger gear wheel 35, by a spring 34$^a$. The gear wheel 35 is journaled upon the hub 6$^a$. The gear wheel 35 is provided with a hub 35$^a$, which carries cams 36 and 37. Cam 36 constitutes the operating element for all of the intake valves, and cam 37 constitutes the operating element for all of the exhaust valves.

By referring to Fig. 4, it will be seen that the uppermost cam 36 will, in its travel in the direction of the arrow $a$, successively thrust outwardly upon rocker arms 38, which are pivoted at 39 upon brackets 40. In acting against the rocker arms, the cam contacts with rollers 39', and the outward movement of the rocker arms acts through thrust rods 40', upon rocker arms 41, which are connected to oscillating shafts 42. These shafts, in turn, carry tappets 43, which thrust inwardly upon the stems of the intake valves 20, moving said valves against the action of springs 44, in a manner well known in the internal combustion engine art. In like manner, the cam 37 acts upon like mechanism to that just described to act through push rods 45, sleeve 46 and tappets 47, to thrust inwardly upon and to open the exhaust valves 21, against the tension of their springs 48.

To suitably pack or seal the pistons at their points of engagement with the inner periphery of the cylinder, and with the cylinder heads, I groove said pistons about said edges, as indicated at 50, and dispose, in said grooves, master packing strips 51, which are spring actuated outwardly by springs 52, and I seat, in the outer faces of said strips, small auxiliary packing strips 53, which are spring actuated by small leaf springs 54. At their outer corners, the packing strips described are overlapped, as indicated at 51$^a$, and to insure that the end packing strips will be maintained in tight engagement with the inner periphery of the cylinder, and with the companion transverse packing strip, I dispose springs 51$^b$ at the inner ends of said end strips, which springs tend to thrust said strips outwardly, or toward the cylinder wall. It is highly important to provide a fluid-tight joint between the shaft 8, and the hubs 6$^a$—7$^a$, respectively. To this end, I annularly groove the shaft, as indicated at 55, and 56. A split packing ring 57 is seated in the groove 55, and carries a pair of spaced segments 58, which are secured to the inner side of the ring 57, and lie in the groove 55. The side face of the ring 57 bears against a block of metal 59, that is softer than the material of the ring, said block of metal being carried by the lower end of the companion radial packing strip.

By referring to Fig. 8, it will be seen that the outer edge of the ring 57 is cut away for the reception of steel pins 60 (see Fig. 10), said pins being carried by the shaft 8. The purpose of these pins is to cause the ring 57 to move with the shaft through, at least, a portion of its travel, and the advantageous results flowing from this are manifold, in that this movement brings about such a wearing action between the periphery of the ring 57 and the hub 6$^a$, as to obtain a tight fit between these parts. In addition, the soft metal 59 will wear more readily than the outer face of the radial master strips 51, so that there will be nothing to interfere with said radial strips moving toward the cylinder heads as fast as any wear takes place, so that wear will be automatically compensated for, and a tight joint will be maintained even after a considerable degree of use of the engine.

A further advantage flowing from this arrangement is that the pins, as they tend to turn the rings, also tend, by reason of the fact that they exert a wedging action, to thrust the ring bodily sidewise into tight engagement with the opposite side of the groove. Additional packing rings 60' may be employed if desired.

It is pointed out that the problem of packing the shaft in the hubs 6$^a$—7$^a$ is more than merely the problem of preventing the escape of gas from the cylinder to the atmosphere. The real problem is to prevent the escape of gas from one combustion chamber over into the other combustion chamber, and I have found that the arrangement above described, in conjunction with the packing strips 13 and associated parts, solves this problem. To further aid in insuring a tight seal, I dispose soft metal packing elements 61 at the ends of the packing strips 13, and bevel the ends of said packing strips, as illustrated in Fig. 8, for the reception of the soft metal packing elements. The particular location of the ignition elements, or spark plugs 62, is immaterial, but I prefer to locate them as illustrated in Fig. 3. I wish to direct particular attention to the shape of the abutments 12.

By referring to Fig. 2, it will be seen that these abutments present what is, in substance, markedly convex faces toward the pistons, and that they are reduced in width at the bottom to permit the pistons to approach relatively close to the abutments. A most important feature resides in the way the abutments are cut away at 12$^a$, and are rounded at 12$^b$. This rounding of the abutments at 12$^b$ eliminates the pre-ignition and glow that would follow if sharp corners were presented while the cutting away of the abutments at 12$^a$ gives such clearance that valves of large area may be employed while, at the same time, the compression space is kept down in proportion to the piston displacement. I preferably make the abutments hollow, in order that cooling water may be led to the interior thereof. In like manner, water may be conducted through the hollow shaft at 64, and delivered through ports 65, to the interior of the piston at 66.

By referring to Fig. 1, it will be seen that the cross head 32 may be shifted upon its guides 33, by the manipulation of a screw 67. Movement of the cross head inwardly, or toward the center of the engine, moves the crank 27 and its block 25 bodily in the same direction. This brings about such a change of angle between the crank and the rod 23, as to result in an increase in the piston throw, and a corresponding decrease in the piston clearance. As before stated, this results in an increase in the amount of fuel that will be drawn into the combustion chamber at each cycle of operation with a corresponding increase in compression.

It is believed that the operation of the engine will be apparent to any one skilled in the art, it being sufficient to say that the firing order is 1, 2, 3, 4; that the direction of revolution is counter clockwise, and that the engine is a four-cycle engine.

It will be understood that oscillatory movement of the shaft imparts rotation to the shaft 28, through the connections described, the rod 23 passing over the top of the shaft 28, as the shaft 8 oscillates in one direction, and under said shaft, as shaft 8 oscillates in the other direction. Thus, it will be seen that the universal joint connections between the oscillatory shaft 8 and the rotative shaft 28 function to permit the driving of the rotative shaft from the oscillatory shaft, despite the fact that these two shafts are disposed at an angle with respect to each other, and though the shaft 28 makes a complete revolution while the shaft 8 does not revolve completely, but merely oscillates.

It is to be understood that the invention is not limited to the precise construction set forth, but that it includes, within its purview, whatever changes fairly come within either the terms or the spirit of the appended claims.

Having described my invention, what I claim is:

1. In an engine of the character described, the combination with an abutment, of an oscillatory piston, movable toward and from said abutment, said abutment presenting a convex face toward the piston.

2. In combination, a cylinder, a piston mounted for oscillation therein, an abutment presenting a markedly convex face toward said piston toward and from which said piston moves, and a valve carried by the cylinder and lying outwardly of the abutment and overlapping a substantial portion of said abutment.

3. An engine of the character described, comprising a cylinder, a piston mounted for oscillation in said cylinder, a shaft by which said piston is carried and a fixed abutment extending between the inner periphery of the cylinder and said shaft, said abutment being materially narrower at its inner and outer ends than at its intermediate portion, and a valve carried by the cylinder outwardly of the abutment, the major portion of which overlies said abutment.

4. The combination with a cylinder, of a piston mounted therein for oscillatory movement, said piston comprising a shaft and a pair of diametrically opposed vanes, a pair of diametrically opposed abutments having convex working faces extending between the inner periphery of the cylinder and the outer periphery of the shaft, and a pair of valves of relatively large area carried by the cylinder outside the outer end of and materially overlying each of said abutments, the outer portions of said abutments being cut-away to such an extent as to permit large area valves to be employed, while, at the same time, permitting the vanes to project close enough to the said abutments to secure relatively high compression.

5. A structure as recited in claim 4, in combination with means for varying the throw of said pistons, to thereby increase the piston displacement and decrease the piston clearance, or vice versa.

6. An engine of the character described, comprising a cylinder, an oscillatory shaft mounted therein, a rotative driven shaft outside of the cylinder and constituting the power shaft of the engine, and being disposed substantially at right angles to the oscillatory shaft, a crank arm carried by said rotative shaft, a block trunnioned in said crank arm, and a rod having slidable movement in said block, said rod being pivotally connected to the outer end of the oscillatory shaft.

7. A structure as recited in claim 6, in combination with means for bodily adjusting the rotative shaft and its crank toward and from said rod.

8. In combination, a cylinder, an oscillatory piston and shaft therein, a rotative shaft disposed outside of the cylinder and substantially at right angles to the oscillatory shaft, a crank arm carried by the rotative shaft, and a rod pivotally connected to the oscillatory shaft, means for connecting the outer end of the rod to the crank, to cause oscillatory movement of the rod to impart rotative movement to the crank, a bevel gear wheel splined upon the rotative shaft, a bevel gear wheel rotatively mounted with respect to the cylinder, rotative cams carried by the last named gear wheel, rocker arms carried by said cams, and valve actuating mechanism actuated by said rocker arms.

9. A structure as recited in claim 8, in combination with spring means for holding the first named bevel gear into engagement with the last named bevel gear, and means for mounting the rotative shaft and its crank for bodily movement with respect to the first named gear wheel toward and from said rod to thereby vary the piston travel of the engine, as described.

10. In combination, a cylinder, a piston mounted for oscillation therein, an abutment toward and from which said piston moves and which presents a markedly convex working face toward the piston, and means for varying the piston travel to cause it to approach said convex face to a greater or less degree.

11. In an engine of the character described, a cylinder, a piston mounted for oscillation therein, an abutment toward and from which said piston moves and which presents a markedly convex face toward said piston, a rotative driven shaft, and a connection between the rotative driven shaft and the oscillatory piston, which is adjustable to vary the degree of throw of the oscillatory piston in its action of driving the rotative shaft.

12. The combination with a cylinder, of an oscillatory shaft mounted therein, a pair of oscillatory vanes carried by said shaft, a pair of diametrically opposed abutments extending between the inner periphery of the cylinder and the outer periphery of the shaft and presenting convex working faces toward the vanes, valves disposed in the cylinder wall outwardly of the abutments, the major portions of said valves being in overlapping relation to the abutments, a rotative driven shaft, a member oscillating with the oscillatory shaft, and connections between the last named member and the driven shaft.

13. The combination with a cylinder, of an oscillatory shaft mounted therein, a pair of oscillatory vanes carried by said shaft, a pair of diametrically opposed abutments extending between the inner periphery of the cylinder and the outer periphery of the shaft and presenting convex working faces toward the vanes, valves disposed in the cylinder wall outwardly of the abutments, the major portions of said valves being in overlapping relation to the abutments, a rotative driven shaft, a member oscillating with the oscillatory shaft, and connections between the last named member and the driven shaft, said connections being of a nature to permit variation of the throw of the oscillatory shaft for a given revolution of the driven shaft, as and for the purposes set forth.

14. A structure as recited in claim 10, in combination with a valve of relatively large area disposed in the cylinder wall outwardly of the abutment, the major portion of said valve being disposed in overlapping relation to said abutment.

15. An engine of the character described, comprising a cylinder, an oscillatory shaft mounted therein and a piston carried by said shaft, a rotative driven shaft outside of the cylinder and constituting the power shaft of the engine and being disposed at an angle to the oscillatory shaft, and a universal joint connection between the oscillatory and the driven shaft of such a nature that oscillation of the oscillatory shaft imparts rotation to the power shaft.

16. An engine of the character described, comprising a cylinder, an oscillatory shaft mounted therein, a rotative driven shaft outside the cylinder constituting the power shaft of the engine and being disposed substantially at right angles to the oscillatory shaft, a crank extension carried by the power shaft, and a universal joint connection between said crank extension and the oscillatory shaft of the engine, as and for the purposes set forth.

17. A structure as recited in claim 16, in combination with means for adjusting the position of the said crank with respect to the said universal joint to vary the degree of throw permitted the oscillatory shaft to each rotation of the driven shaft.

In testimony whereof I affix my signature.

FRANK E. GOUGH.